(12) United States Patent
Miller et al.

(10) Patent No.: US 6,788,447 B2
(45) Date of Patent: Sep. 7, 2004

(54) OFF-CHIP MATCHING CIRCUIT FOR ELECTROABSORPTION OPTICAL MODULATOR

(75) Inventors: Thomas James Miller, Fleetwood Township, Berks County, PA (US); James Kevin Plourde, Allentown, PA (US)

(73) Assignee: TriQuint Technology Holding Co., Hillsboro, OR (US)

( * ) Notice: Subject to any disclaimer, the term of this patent is extended or adjusted under 35 U.S.C. 154(b) by 174 days.

(21) Appl. No.: 10/214,063

(22) Filed: Aug. 7, 2002

(65) Prior Publication Data

US 2004/0027633 A1 Feb. 12, 2004

(51) Int. Cl.[7] .................................................. G02F 1/03
(52) U.S. Cl. ........................................................ 359/245
(58) Field of Search ................................ 359/245, 237, 359/249, 248

(56) References Cited

U.S. PATENT DOCUMENTS

| | | | |
|---|---|---|---|
| 5,732,097 A | | 3/1998 | Yamaguchi et al. |
| 5,793,516 A | | 8/1998 | Mayer et al. |
| 5,917,637 A | * | 6/1999 | Ishikawa et al. ............ 398/197 |
| 5,930,022 A | | 7/1999 | Okuma |
| 5,953,149 A | * | 9/1999 | Ishizaka ...................... 359/248 |
| 5,991,060 A | | 11/1999 | Fishman et al. |
| 5,995,270 A | | 11/1999 | Kawano |
| 6,031,851 A | | 2/2000 | Shimizu et al. |

* cited by examiner

Primary Examiner—Hung Xuan Dang
Assistant Examiner—Tuyen Tra

(57) ABSTRACT

An impedance matching circuit for an electroabsorption optical modulator addresses the conflicting concerns of being located electrically "near" the modulator, while being disposed on a separate piece part, by using an inductor as a low frequency impedance matching component, the inductor disposed in series between an off-chip high frequency impedance matching circuit and the electroabsorption optical modulator. By separating the impedance matching requirements into separate "low" and "high" frequency components, the series inductor may be used to provide the necessary low frequency impedance matching, while also forming the required physical separation between the electroabsorption optical modulator and the (conventional) high frequency impedance matching circuit.

7 Claims, 5 Drawing Sheets

EQUIVALENT CIRCUIT OF ELECTROABSORPTION MODULATOR

NORMAL

F1: 0.05000
F2: 12.0000

OFF-CHIP MATCHING CIRCUIT FOR ELECTROABSORPTION OPTICAL MODULATOR

TECHNICAL FIELD

The present invention relates to electroabsorption (EA) optical modulators and, more particularly, to an impedance matching circuit for EA modulators that provides broadband matching while being physically separated from the location of the EA modulator.

BACKGROUND OF THE INVENTION

In a conventional arrangement of an electroabsorption optical modulator, the modulator is positioned on an optical substrate, with an input (cw) optical signal applied along the input facet of the optical device and an output, modulated optical signal exiting from the output facet of the optical device; the input and output facets being defined as a pair of parallel endfaces. An electrical modulating signal is coupled to a surface area of the electroabsorption optical modulator, where the presence of this electrical signal will alter the characteristics of the input optical signal so as to produce a desired modulated waveform in the output optical signal.

In most cases, a microstrip transmission line element is used to couple the electrical signal between an external signal source and the electroabsorption optical modulator, due to the high frequency of the modulation signal. In order to allow for optimum signal transfer from the external signal source to the optical modulator, it is beneficial to provide impedance matching between these elements to improve the return loss of the modulator (hence, providing improved efficiency in the optical system). In most cases, a 50-ohm terminating resistor (i.e., transmission line) is connected in parallel with the modulator and used for impedance matching purposes. If the modulator is operating at high impedance, then the transmission line provides a good match and power is conserved. However, if the modulator is operating at a low impedance level, the impedance as seen from the electrical signal generator declines, impedance mis-matching occurs and the optical output waveform deteriorates.

Satisfying the desired input impedance matching specifications for an electroabsorption modulator in both low frequency and high frequency modes is problematic in that the impedance matching circuit needs to be electrically located near the modulator (to reduce the value of the transmission line impedance between the circuit and the modulator), while from a physical standpoint, it is desirable for the impedance matching circuit to be formed as a separate component, in order to optimize produce manufacturability.

A need remains in the art, therefore, for an impedance matching circuit that meets both the desired electrical and physical criteria.

SUMMARY OF THE INVENTION

The need remaining in the art is addressed by the present invention, which relates to electroabsorption optical modulators and, more particularly, to an impedance matching circuit for EA optical modulators that provides sufficient broadband matching while being physically removed from the location of the EA optical modulator.

In accordance with the present invention, an impedance matching circuit is formed to include both a low frequency matching section and a high frequency matching section, and configured into a topology such that a series inductor (used for low frequency impedance matching) is disposed between the signal source/high impedance matching circuit and the EA modulator itself. The use of a series inductor, therefore, allows for the high frequency portion of the impedance matching circuit to be physically separated from the modulator (i.e., formed off-chip with respect to the modulator). A conventional 50-ohm resistance element (such as a transmission line) may be used to provide high frequency impedance matching, as with the prior art.

In a preferred embodiment of the present invention, the series inductor comprises a set of wirebonds disposed between the transmission line and the modulator, although other arrangements are possible. Indeed, other and further aspects of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
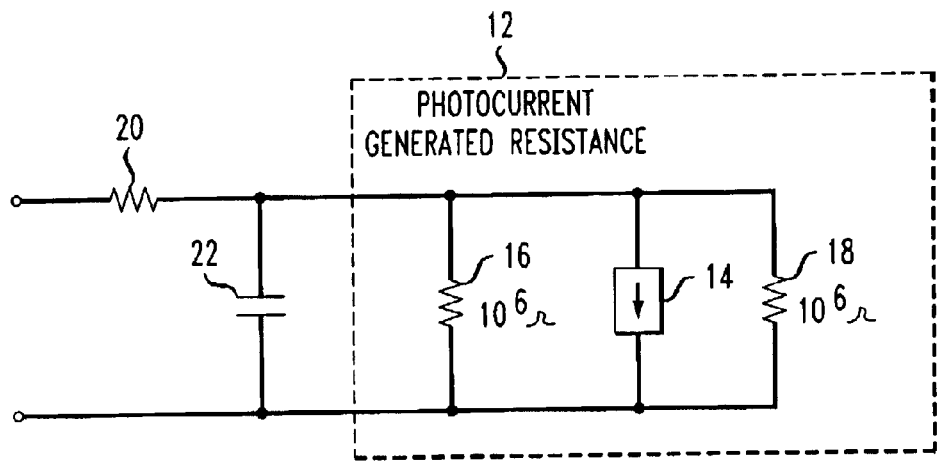
FIG. 1 is a conventional, prior art equivalent circuit representation of an electroabsorption optical modulator.
Figure 2:
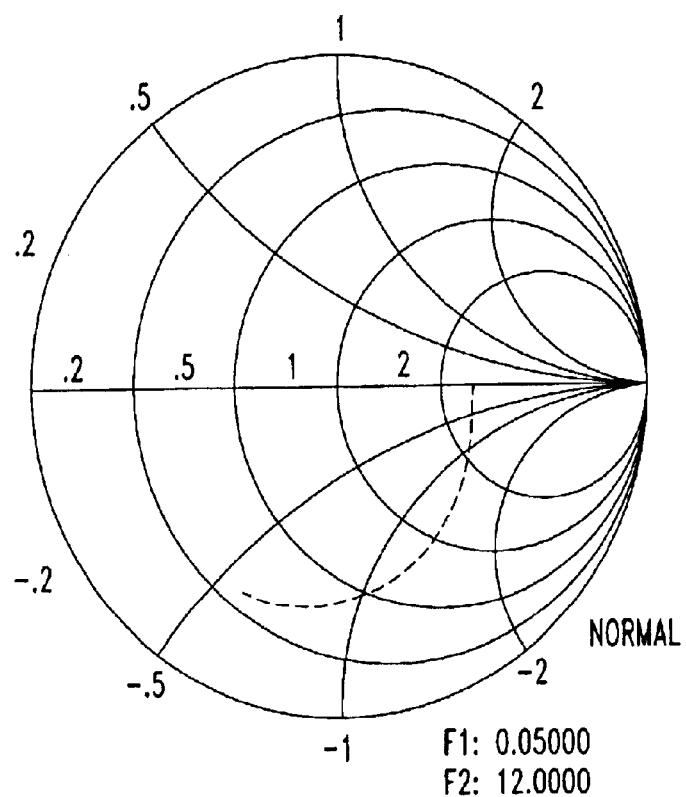
FIG. 2 is a Smith chart illustrating the resulting input impedance for the device of FIG. 1.

FIG. 1 contains an equivalent circuit representation 10 of a conventional prior art electroabsorption optical modulator. Typically, a high speed electroabsorption modulator represents a wide impedance load to the electrical drive circuit (not shown). The photocurrent-generated resistance 12 in FIG. 1 is represented by a voltage-controlled current source 14 in parallel with a large-valued resistor 16 (for example, on the order of $10^6$ Ω). A terminating resistor 18 (also large-valued) is included in circuit 10, as is an input R-C circuit comprising a resistor 20 on the order of 10Ω and a capacitor 22 on the order of 0.6 pf. FIG. 2 is a Smith chart illustrating the input impedance for the arrangement of FIG. 1 over the typically operating frequency band of 0.5–12 GHz, using a nominal transconductance of $0.0085Ω^{-1}$.

As mentioned above, it is desirable for the impedance matching circuit of an electroabsorption modulator to be located on a separate piece part within the packaged modulator, primarily for ease in the manufacturing process. Therefore, taking into account the use of an additional transmission line to separate the components, the input impedance for a modulator becomes as shown in the Smith chart of FIG. 3 (over the same frequency range of 0.5 to 12 GHz). Thus, it can be seen that although impedance matching the characteristic in FIG. 2 is difficult, a much greater challenge is presented by using the "real world" characteristics as shown in FIG. 3, which takes into account the use of separate physical components as mounts for the impedance matching circuit and the electroabsorption modulator.

Figure 3:
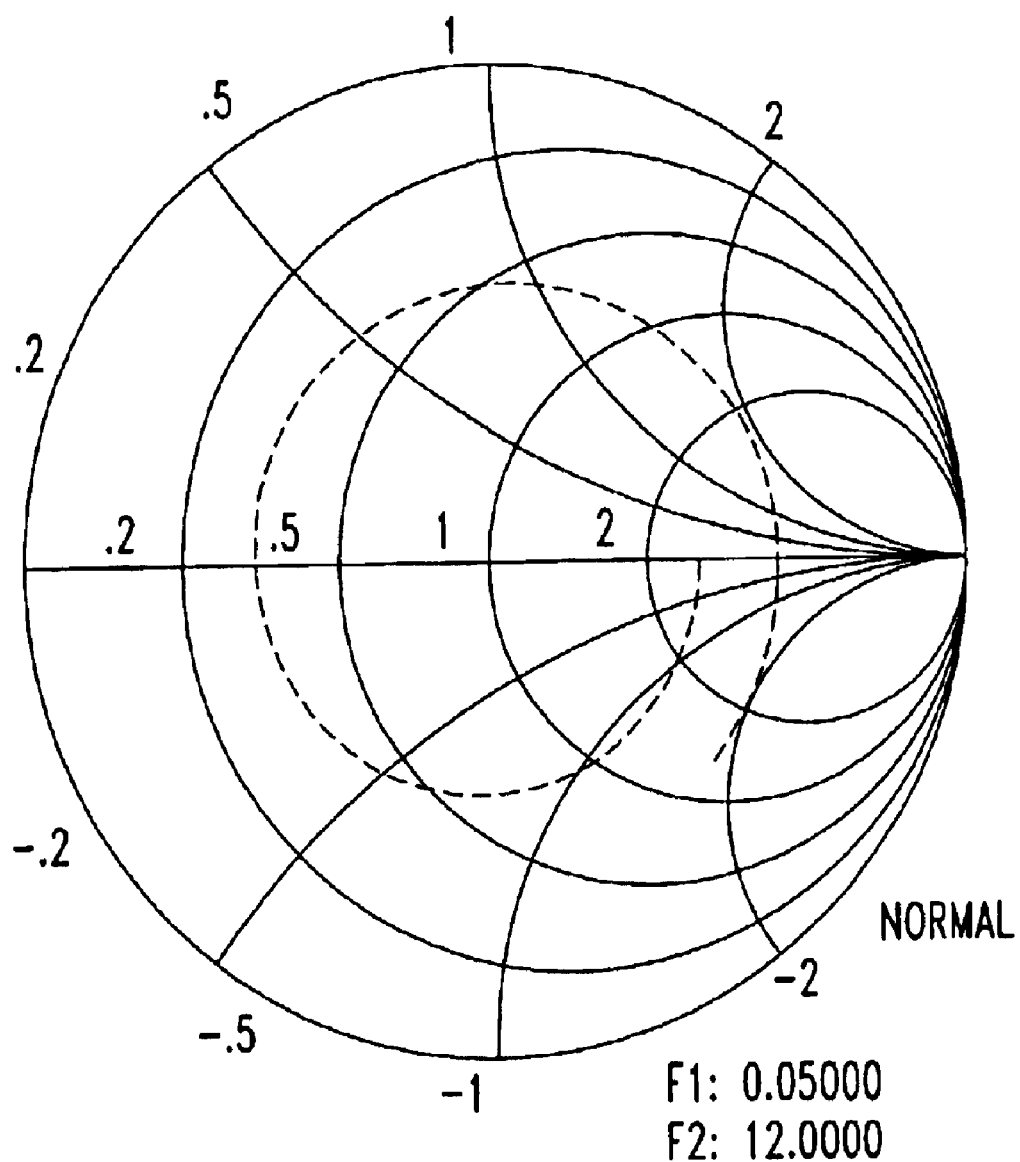
FIG. 3 contains a Smith chart illustrating the change in input impedance for the modulator of FIG. 1 when a conventional microstrip transmission line impedance matching element is used.

In accordance with the present invention, the task of providing impedance matching to the characteristic as illustrated in FIG. 3 is accomplished by using a series inductor between a conventional (high frequency) impedance matching circuit and the electroabsorption optical modulator. Such an arrangement thus allows for the inductor to be realized as a wirebond, thereby allowing for the high frequency portion of the matching circuit to be located on a physically different mounting structure than the modulator itself. The wirebonds thus comprise the low frequency section, exhibiting an inductive coupling between the transmission line and the EA optical modulator. In the arrangement of the present invention, therefore, the low and high frequency sections can be separated and the high frequency matching circuit can be positioned on an adjacent circuit section, such as the input transmission line.

Figure 4:
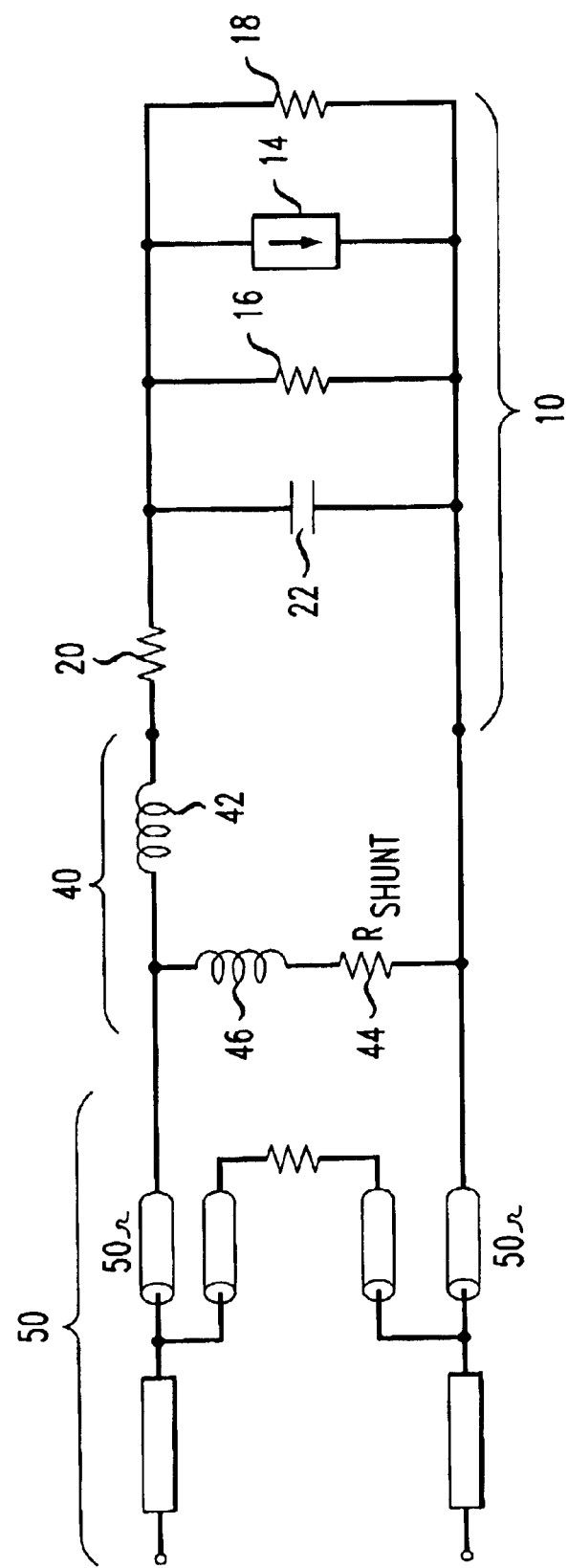
FIG. 4 is an equivalent circuit representation of an electroabsorption modulator and off-chip impedance matching circuit of the present invention.
Figure 5:
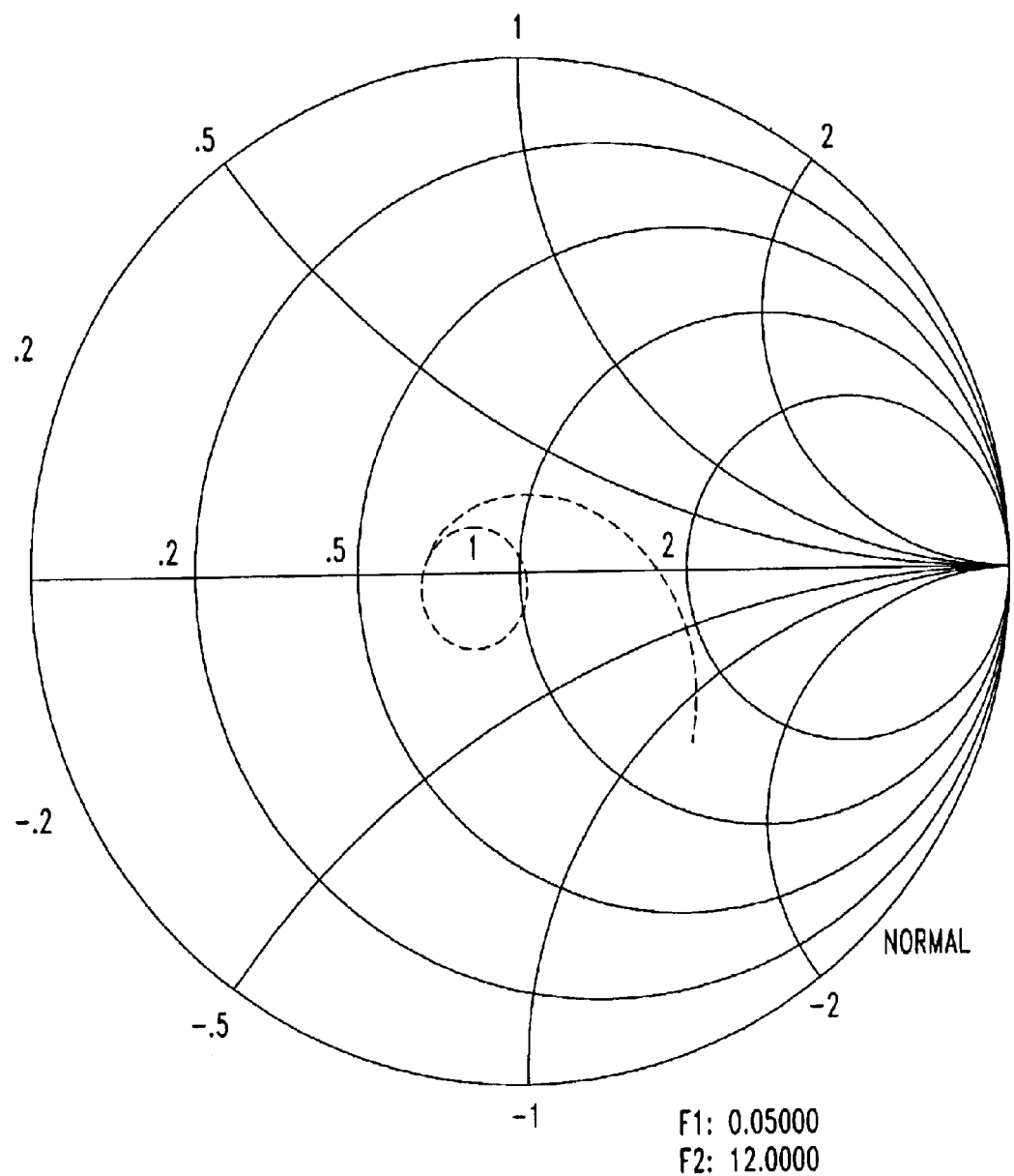
FIG. 5 is a Smith chart illustrating the impedance matching performance of the arrangement of FIG. 4.

FIG. 4 illustrates an equivalent circuit arrangement of both an electroabsorption modulator 10, as shown in FIG. 1, with an off-chip impedance matching circuit 40, formed in accordance with the present invention. Also shown in FIG. 4 is the electrical equivalent circuit for the stripline line transmission path 50 used for high frequency impedance matching and connection between an electrical signal source (not shown) and the electroabsorption modulator. Referring to FIG. 4, impedance matching circuit 40 of the present invention comprises a first inductor 42, disposed in series between transmission path 50 and modulator 10. Impedance matching circuit 40 further comprises an R-L circuit including a shunt resistance 44 and inductor 46 disposed as shown in FIG. 4. The values for inductor 42, resistor 44 and inductor 46 are chosen to provide the desired low frequency impedance matching. FIG. 5 contains a Smith chart representation of the input impedance match obtained with the arrangement of the present invention as illustrated in FIG. 4. Referring to FIG. 5, it is seen that a desirable return loss of, approximately 14 dB is achieved to a frequency value of 10 GHz.

Figure 6:
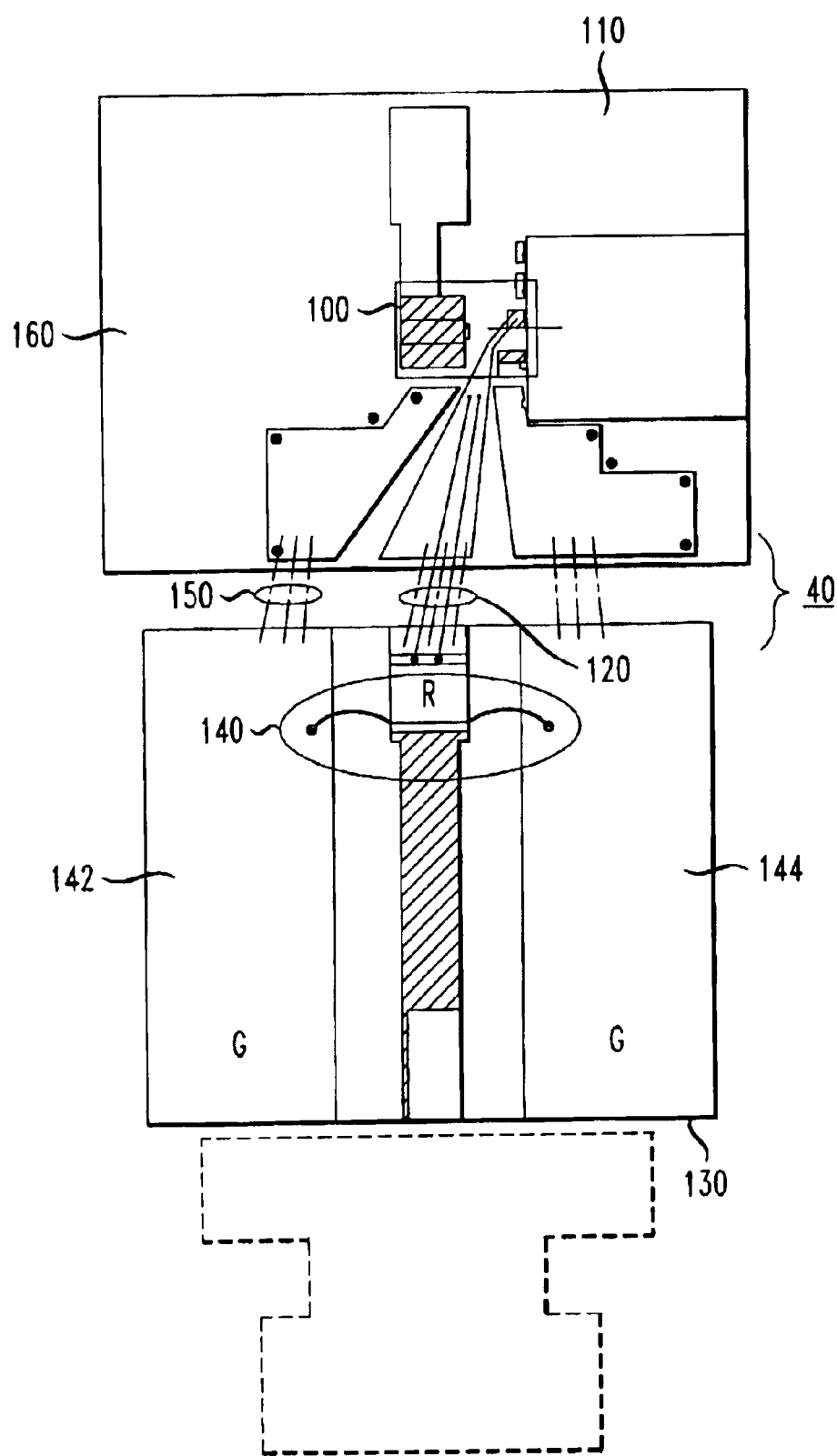
FIG. 6 illustrates a physical model of the modulator and impedance matching circuit of FIG. 4, utilizing a set of wire bonds as the series inductor element.

FIG. 6 contains a top view of an exemplary physical implementation of the impedance matching arrangement of the present invention. Referring to FIG. 6, an exemplary electroabsorption optical modulator 100 is disposed on a first silicon submount 110, where first submount 110 also supports various other transmitter components not relevant to the purposes of the present invention. Impedance matching circuit 40 of the present invention is formed using a plurality of wirebonds 120 between first submount 110 and a second submount 130, the second submount 130 located in relative proximity to (but physically separated from) first submount 110. Indeed, the two submounts may be separated by a gap on the order of 10 mils. As shown, shunt resistor 42 and its series inductance 44 are disposed on submount 130, inductance 44 represented by wirebonds 140 between resistor 42 and ground planes 142 and 144. An additional amount of parasitic inductance may result from the wirebond connections 150 between ground planes 142,144 on second submount 130 and a ground plane 160 on first submount 110.

It is to be understood that apparently widely varying different embodiments of the present invention can be made without departing from the spirit and scope thereof. Therefore, it is asserted that the spirit and scope of the present invention is not to be limited to the specific embodiments described hereinabove, but rather as defined by the claims appended hereto.

What is claimed is:

1. A broadband circuit for providing impedance matching between an electrical signal source and an electroabsorption optical modulator, said electrical signal source and said electroabsorption optical modulator being physically separated with said electroabsorption optical modulator disposed on a first submount, said broadband circuit comprising
    a second submount for supporting a transmission line conductor between the electrical signal source and said electroabsorption optical modulator, said second submount further supporting a shunt resistance element for supplying high frequency impedance matching between said electrical signal source and said electroabsorption optical modulator; and
    a series inductance element coupled between said shunt resistance and said electroabsorption optical modulator for providing both an electrical connection and low frequency impedance matching between said electrical signal source and said electroabsorption optical modulator.

2. A broadband circuit as defined in claim 1 wherein the series inductance element comprises a plurality of wirebonds disposed between the shunt resistance and the electroabsorption optical modulator.

3. A broadband circuit as defined in claim 1 wherein the circuit further comprises a plurality of wirebond connections between a ground plane on the first submount and a ground plane on the second submount.

4. An optical module comprising
    an optical device having as inputs both an optical signal and an electrical signal, for providing as an output a modified optical signal, said optical device exhibiting a predetermined impedance; and
    a broadband circuit coupled at a first end as the electrical signal input to said optical device, said broadband circuit for providing impedance matching between an external electrical signal source, coupled at a second, opposite end to said broadband impedance matching circuit, and the optical device, said electrical signal source and said optical device being physically separated with said optical device disposed on a first submount, said broadband circuit comprising
        a second submount for supporting a transmission line conductor between the electrical signal source and said optical device, said second submount further supporting a shunt resistance element for supplying high frequency impedance matching between said electrical signal source and said optical device; and
        a series inductance element coupled between said shunt resistance and said optical device for providing an electrical connection and low frequency impedance matching between said electrical signal source and said optical device.

5. An optical module as defined in claim 4 wherein the series inductance element comprises a plurality of wirebonds disposed between the shunt resistance and the optical device.

6. An optical modulate as defined in claim 4 wherein the broadband impedance matching circuit further comprises a plurality of wirebond connections between a ground plane on the first submount and a ground plane on the second submount.

7. An optical module as defined in claim 4 wherein the optical device comprises an electroabsorption optical modulator.

* * * * *